(12) United States Patent
Soryal et al.

(10) Patent No.: US 12,113,827 B2
(45) Date of Patent: Oct. 8, 2024

(54) COORDINATED CELLULAR NETWORK ATTACK DETECTION AND MITIGATION

(71) Applicant: AT&T Intellectual Property I, L.P., Atlanta, GA (US)

(72) Inventors: Joseph Soryal, Glendale, NY (US); Dylan Chamberlain Reid, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 400 days.

(21) Appl. No.: 17/654,104

(22) Filed: Mar. 9, 2022

(65) Prior Publication Data

US 2023/0291763 A1  Sep. 14, 2023

(51) Int. Cl.
*H04W 4/14* (2009.01)
*H04L 9/40* (2022.01)
*G06N 20/00* (2019.01)

(52) U.S. Cl.
CPC ...... *H04L 63/1458* (2013.01); *H04L 63/1425* (2013.01); *H04W 4/14* (2013.01); *G06N 20/00* (2019.01)

(58) Field of Classification Search
CPC .. H04L 63/1458; H04L 63/1425; H04W 4/14; G06N 20/00
USPC .......................................................... 726/22
See application file for complete search history.

(56) References Cited

U.S. PATENT DOCUMENTS

| | | | | |
|---|---|---|---|---|
| 9,069,957 B2* | 6/2015 | Tuvell | ................... | H04L 63/145 |
| 9,351,167 B1* | 5/2016 | Adams | ................ | H04W 12/128 |
| 10,438,207 B2* | 10/2019 | Subhedar | ............. | G06Q 20/405 |
| 10,715,542 B1* | 7/2020 | Wei | ........................ | G06F 16/958 |
| 10,880,270 B1* | 12/2020 | Rigor | ................... | H04L 63/0263 |
| 11,381,974 B2* | 7/2022 | Ranjbar | ................ | H04W 12/12 |
| 11,632,391 B2* | 4/2023 | Doron | ................. | H04W 12/122 |
| | | | | 726/23 |
| 2008/0086776 A1* | 4/2008 | Tuvell | ................... | G06F 21/552 |
| | | | | 726/24 |
| 2008/0178294 A1* | 7/2008 | Hu | ........................ | G06F 21/566 |
| | | | | 726/24 |
| 2010/0175134 A1* | 7/2010 | Ali-Ahmad | ............. | G06F 3/048 |
| | | | | 726/25 |

(Continued)

OTHER PUBLICATIONS

"The Evolution of Security in 5G," 5G Americas Whitepaper, https://www.5gamericas.org/wp-contentuploads/2019/07/5G_Americas_5G_Security_White_Paper_Final.pdf, Oct. 2018, 41 pages.

(Continued)

*Primary Examiner* — Thanh T Le

(57) ABSTRACT

The described technology is generally directed towards coordinated cellular network attack detection and mitigation. A security function deployed at a network node can monitor network traffic conditions for anomalous behavior indicative of a coordinated attack. In response to detecting the anomalous behavior, the security function can respond with any of several different attack mitigation procedures, in order to protect the network from the coordinated attack. Furthermore, the security function can collect data from connected devices, and use the data to identify malicious code. The security function can then send data and instructions to the connected devices to enable the connected devices to isolate or remove the malicious code.

20 Claims, 10 Drawing Sheets

(56) References Cited

U.S. PATENT DOCUMENTS

| | | | | |
|---|---|---|---|---|
| 2011/0113489 A1* | 5/2011 | Nakhre | ............... | H04L 63/1458 |
| | | | | 709/224 |
| 2017/0359306 A1* | 12/2017 | Thomas | .................. | H04L 63/10 |
| 2018/0039776 A1* | 2/2018 | Loman | .................. | G06F 21/566 |
| 2019/0005239 A1* | 1/2019 | Park | ....................... | G06F 21/563 |
| 2020/0382537 A1* | 12/2020 | Compton | ............ | H04L 63/1416 |
| 2023/0247435 A1* | 8/2023 | Pandit | ................. | H04W 12/121 |
| | | | | 455/411 |

OTHER PUBLICATIONS

"Security Considerations for the 5G Era," A 5G Americas White Paper, https://www.5gamericas.org/wp-content/uploads/2020/07/Security-Considerations-for-the-5G-Era-2020-WP-Lossless.pdf, Jul. 2020, 16 pages.

Weinberg, "A step by step guide to Silent SMS Attacks and Security," Firstpoint, https://www.firstpoint-mg.com/blog/step-by-step-silent-sms-attacks/, Jan. 19, 2021, 5 pages.

* cited by examiner

COORDINATED CELLULAR NETWORK ATTACK DETECTION AND MITIGATION

TECHNICAL FIELD

The subject application is related to cellular communication networks, and more particularly, to security measures to prevent cyberattacks involving cellular communication networks.

BACKGROUND

Cyberattacks on cellular communication networks are increasing in sophistication. Some example cyberattacks can stealthily infect large groups of devices with malicious code. The infected devices can be, e.g., Internet of Things (IoT) devices, tablets, edge nodes, autonomous vehicles, mobile telephones, etc. The infected devices can exhibit coordinated behaviors such as forced power cycles and generating unnecessary communications, which can potentially degrade or disable the cellular service provided by one or more network cells. Other example cyberattacks can involve infected and/or unauthenticated devices that coordinate bulk emergency calls, in order to take down emergency services.

Furthermore, a challenge in addressing modern cyberattacks is, cyberattacks can make use of malicious software which is sufficiently advanced that it can counter anti-virus and other security measures installed on devices. Therefore, technologies that address cyberattacks must also employ increasing sophistication.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
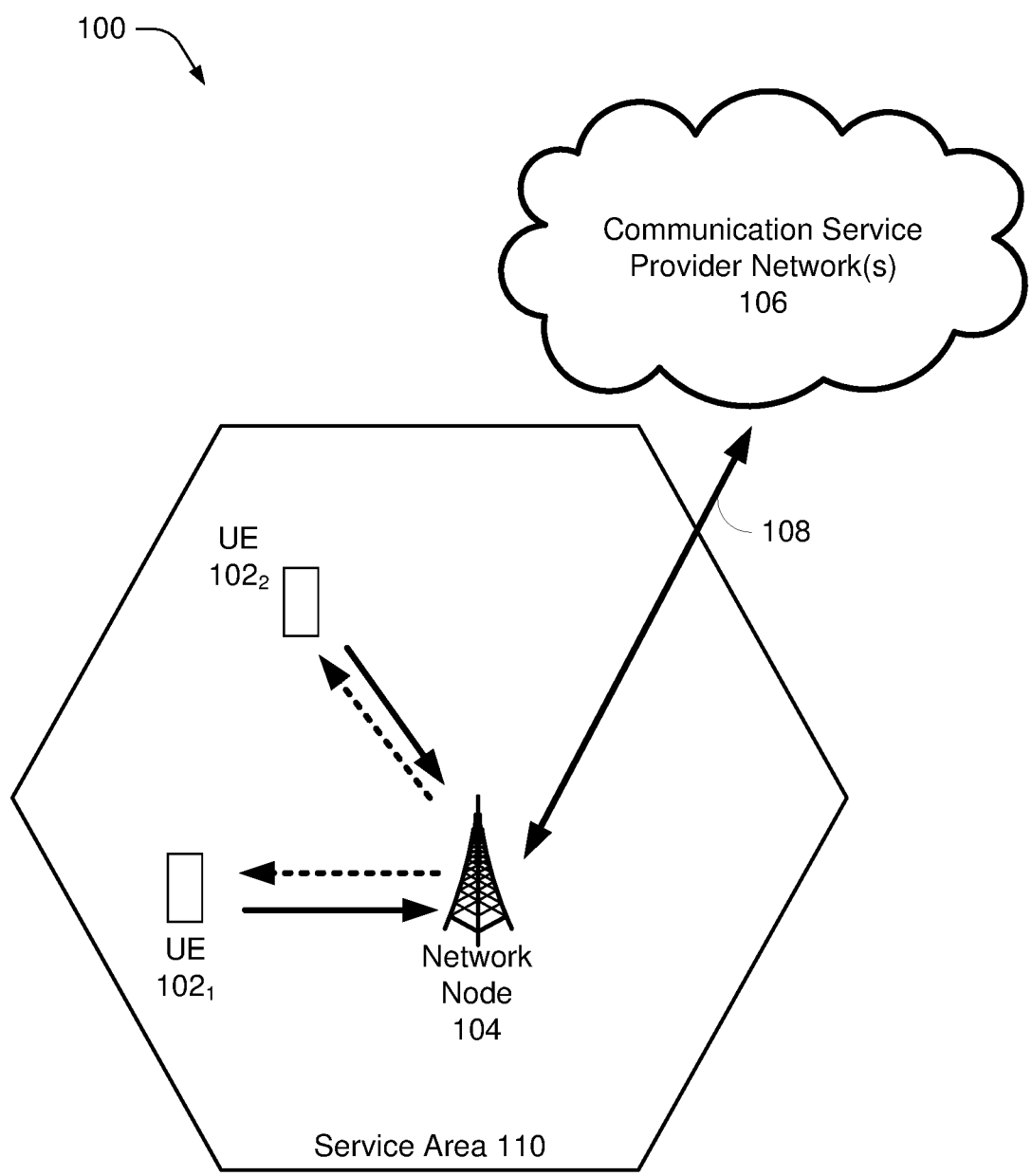
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards coordinated cellular network attack detection and mitigation. A security function deployed at a network node can monitor network traffic conditions for anomalous behavior indicative of a coordinated attack. In response to detecting the anomalous behavior, the security function can respond with any of several different attack mitigation procedures, in order to protect the network from the coordinated attack. Furthermore, the security function can collect data from connected devices, and use the data to identify malicious code. The security function can then send data and instructions to the connected devices to enable the connected devices to isolate or remove the malicious code. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site." "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, internet of things (IoT) devices, and the like.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHZ) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
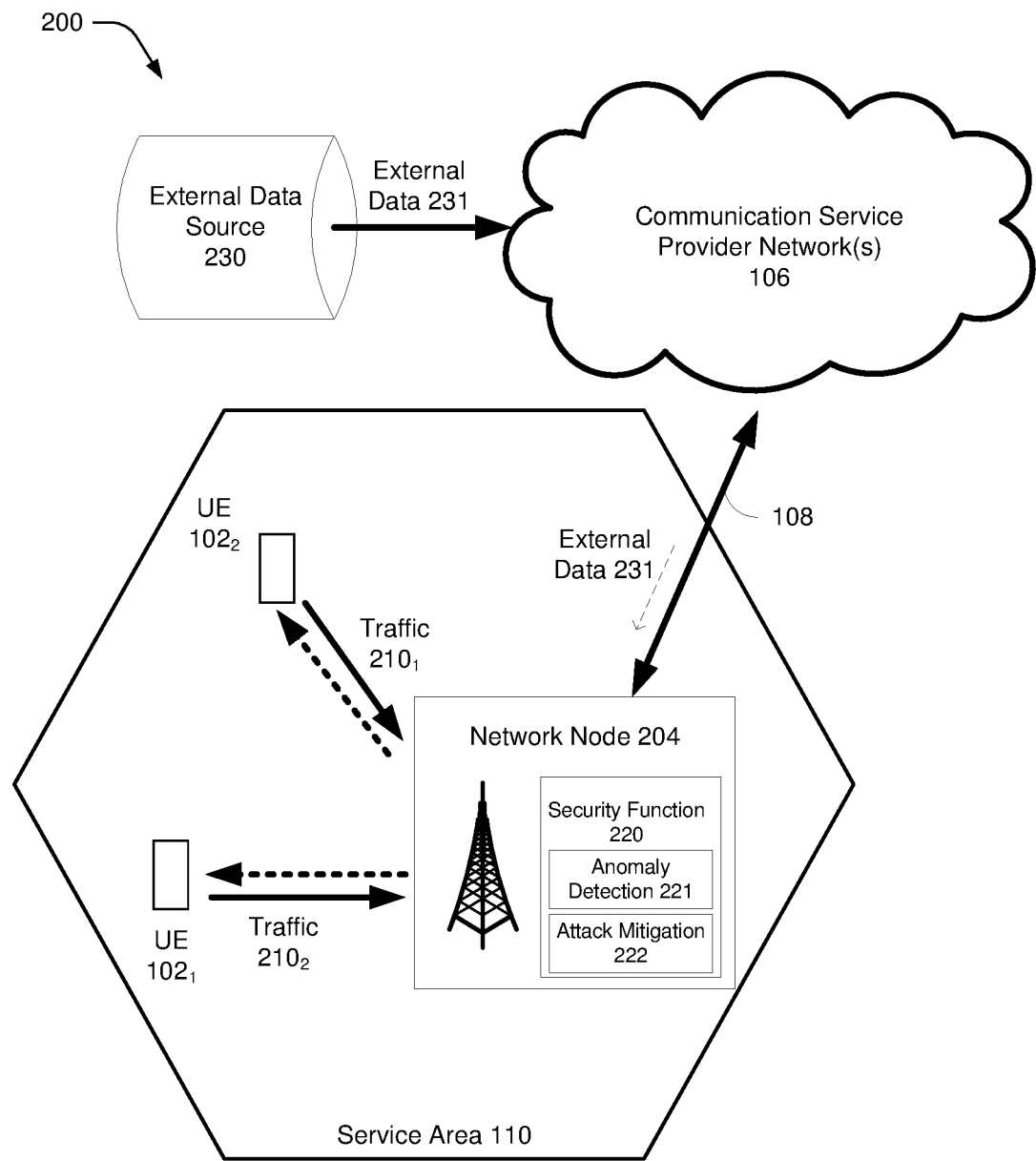
FIG. 2 illustrates an example security function deployed in a network node, in accordance with various aspects and embodiments of the subject disclosure.

FIG. 2 illustrates an example security function deployed in a network node, in accordance with various aspects and embodiments of the subject disclosure. FIG. 2 illustrates a wireless communication system 200 which includes the UEs 102, the service area 110, the backhaul link 108, and the communication service provider network(s) 106 introduced in FIG. 1. FIG. 2 furthermore includes a network node 204 which can provide the functions of the network node 104 introduced in FIG. 1, and the network node 204 can additionally comprise a security function 220 as described herein. The security function 220 can include, inter alia, anomaly detection 221 and attack mitigation 222. The security function 220 can use network traffic, e.g., traffic 2101 and traffic 2102 (referred to collectively as network traffic 210) as well as external data 231 in connection with its operations, as described herein. The external data 231 can be supplied from an external data source 230, e.g., a local news or other data source, adapted to provide external data 231 to the network node 204 via the communication service provider network(s) 106.

In some embodiments, the security function 220 can be configured to perform either or both of two coordinated attack prevention functions. A first coordinated attack prevention function can comprise coordinated attack detection and mitigation. The security function 220 can use anomaly detection 221 and attack mitigation 222 in connection with the first function. A second coordinated attack prevention function can comprise detecting and disabling malicious files at user equipment 102. Example components and operations of the security function 220 in connection with detecting and disabling malicious files are discussed further on connection with FIG. 3.

In some examples according to FIG. 2, the external data source 230 can comprise, e.g., a local news data source which may contain data pertaining to events such as sporting events, concerts, emergencies, elections, etc., that may occur within a geographic area that encompasses the service area 110. In other examples, external data source 230 can comprise additional or different external data. The term "external data" as used herein is defined as data that originates outside of the communication service provider network(s) 106.

Example operations according to FIG. 2 can comprise, for example, simultaneously monitoring, by anomaly detection 221, the external data source 230 and one or more network traffic conditions of network traffic 210. An example network traffic condition can comprise overall traffic volume, however, numerous other traffic conditions such as traffic priority levels, traffic latency, traffic volume per network slice, and other conditions can be monitored in some embodiments.

The monitoring performed by anomaly detection 221 can optionally apply machine learning to learn how variation of the external data source 230 correlates with variation of the network traffic 210. Over time, the anomaly detection 221 can build a knowledge base or other data structure that can define typical expected traffic condition ranges, which are expected for different states of the external data source 230. The expected traffic condition ranges can comprise a variable traffic condition range, which can vary based on variation of the external data source 230. Further discussion of the variable traffic condition range is set forth in connection with FIG. 5. The variable traffic condition range may be different for different geographic areas, and for this reason, embodiments of this disclosure can deploy the security function 220 at or near the network node 204, so that the security function 220 can learn a localized variable traffic condition range applicable to the service area 110.

After anomaly detection 221 has built a knowledge base or other data structure that allows it to identify the variable traffic condition range, anomaly detection 221 can be configured to determine whether a current traffic condition of traffic 210 falls within the variable traffic condition range corresponding to a current state of external data source 230. If the current traffic condition of traffic 210 is within the expected range, then anomaly detection 221 can proceed with normal operation, without flagging a traffic anomaly. However, if the current traffic condition of traffic 210 is outside the expected range, then anomaly detection 221 can flag a traffic anomaly, indicative of a potential coordinated attack.

In response to detection of a traffic condition anomaly by anomaly detection 221, the security function 220 can be configured to activate attack mitigation 222 to mitigate the effects of a coordinated attack. Attack mitigation 222 can optionally use any or all of multiple different attack mitigation techniques. Attack mitigation 222 can optionally be configured to select an appropriate attack mitigation technique based on detected features of the coordinated attack. In general, attack mitigation 222 can be configured to throttle or block certain types of network traffic, in order to protect the network node 204 or other network equipment from becoming overwhelmed.

In a typical coordinated attack, the attackers leverage the potential large number of devices in a single geographical area, by stealthily infecting large group of UE devices 102, and then causing the UEs 102 to exhibit coordinated behaviors such as forced power cycles and/or generating unnecessary communications. Unauthenticated UE devices may attempt to make emergency call in bulk, or a malicious application or piece of code at the UEs may attempt to send a meaningless bulk data.

Example operations of the security function 220 can include, inter alia, grouping UEs 102 into multiple verticals such as same geographical area, same type of devices such as IoTs or mobile telephones, same behaviors such as video streaming, etc. Over time the security function 220 can determine UE 102 usage and behavior thresholds to establish traffic condition ranges. A backend server implemented at network node 204 or in communication service provider network(s) 106 can process external data 231, e.g., considering local news events that may trigger different UE behavior such as a local high school game, an accident, a flash flood, etc. Based on such external data 231, the traffic condition ranges can be relaxed (wider) in anticipation of certain external data 231 events, and traffic condition ranges can be narrower during periods when external data 231 indicates baseline behavior.

In an embodiment, anomaly detection 221 can be implemented at a backend server and can be configured to query external data source 230, e.g., local and global news, weather, traffic reports, game schedules, movie premiers, and/or other external data. If there are no triggering events in external data 231, but the traffic 210 nonetheless changes and appears to be coordinated or semi coordinated, then the security function 220 can be triggered with a positive anomaly determination.

In some examples, anomaly detection 221 can be configured to furthermore analyze traffic 210 for indications of multiple UE power reboots, even if staggered, and for unsustainable traffic 210 spikes that do not match traffic patterns preceding the spikes (e.g., a sudden, heavy traffic 210 comprising streaming videos). Furthermore, the security function 220 can optionally be configured to coordinate between adjacent network nodes, for detection of coordinated attacks across multiple network nodes, as discussed further in connection with FIG. 6. The security function 220 can furthermore analyze the traffic 210 for indications of changes in mobile nodes coming in and out of a troubled coverage area, such as service area 110.

In response to detection of an anomaly, the security function 220 can activate attack mitigation 222. In some embodiments, attack mitigation 222 can be configured to compute available RAN resources and resources required by any RAN nodes affected by the attack.

In response to detection of coordinated attacks involving excessive emergency calls, attack mitigation 222 can be configured to temporarily prioritize emergency calls, and attack mitigation 222 can interact with emergency services to determine whether the emergency calls are frivolous calls. In an example embodiment, attack mitigation 222 can be configured to automatically analyze call detail records (CDRs) to determine whether calls have been terminated abnormally, e.g., terminated in amounts of time that are shorter than a baseline time, or terminated in a narrowly distributed amount of time which varies less than a baseline distribution.

In response to detection of coordinated attacks involving signaling storms and/or power reboots, attack mitigation 222 can be configured to stagger the process of registering the UEs, while optionally enabling UEs for emergency calls. UEs can be registered according to assigned priority levels. An example priority assignment can comprise, e.g., a first priority assigned to UEs that had an active call/session prior to the power cycle; a second priority assigned to UEs that historically make calls during the current time; a third priority assigned to unmanned devices (IoTs) that have low memory resources; and a fourth priority assigned to devices that were idle for a predetermined time interval prior to power cycle. Some embodiments can change the above priorities and/or insert other classes of devices in the priority order. In some embodiments, attack mitigation 222 can be configured to provide different size puzzles to each UE during a signaling process. Once the puzzle is solved, a UE can be re-registered. The puzzles can comprise, e.g., a series of session initiation protocol (SIP) queries.

In response to detection of coordinated attacks involving transmitting abnormally large amounts of data, attack mitigation 222 can be configured to throttle traffic coming from UEs that exhibit a rise in traffic rate that is large (e.g. over a defined threshold) and recent (e.g. within a predetermined trailing time window). Attack mitigation 222 can throttle traffic, e.g., by assigning, to designated traffic, slower links to the communication service provider network(s) 106.

In some embodiments, attack mitigation 222 can be configured to observe dynamic changes at UEs, and throttle traffic from UEs that do not exhibit dynamic changes. Dynamic changes can be an indicator of human involvement, rather than automated activity. For example, when a human is watching a movie and the rate or quality decreases, the human will make dynamic changes such as trying to close the application and open it again, or changing to a different application. In contrast, malicious applications generally do not attempt dynamic changes to the same extent.

Figure 3:
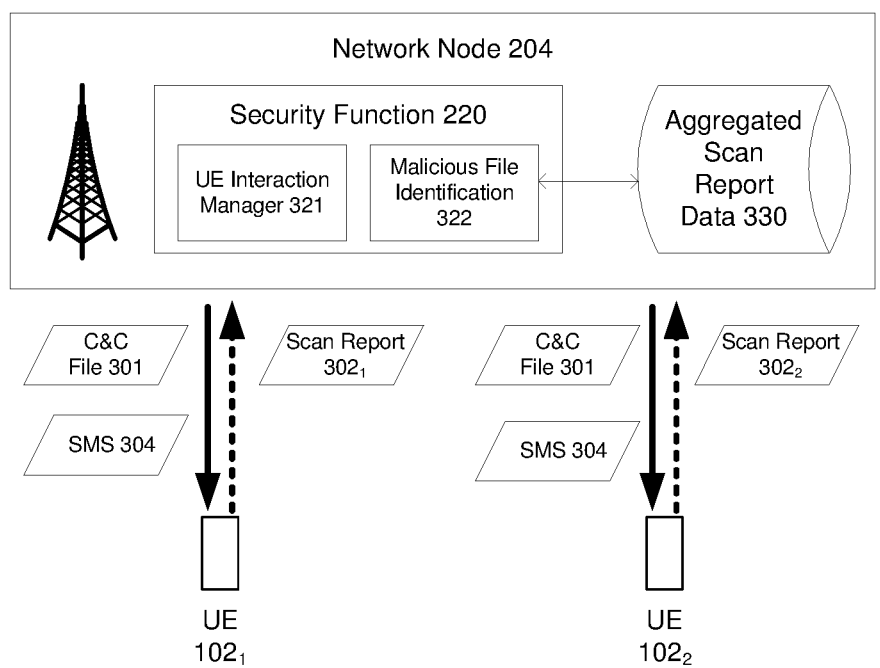
FIG. 3 illustrates additional example aspects of the security function introduced in FIG. 2, in accordance with various aspects and embodiments of the subject disclosure.

FIG. 3 illustrates additional example aspects of the security function introduced in FIG. 2, in accordance with various aspects and embodiments of the subject disclosure. FIG. 3 includes the network node 204, the security function 220, and the UEs 102 introduced in FIG. 2. Additional aspects of the security function 220 illustrated in FIG. 3 include UE interaction manager 321 and malicious file identification 322. Malicious file identification 322 can interact with aggregated scan report data 330, which can optionally be stored at the network node 204. FIG. 3 furthermore illustrates communications between the network node 204 and the UEs 102, including sending a command and control file 301 from the network node 204 to the UEs 102, sending scan reports 3021 and 3022 from the UEs 102 to the network node 204, and sending SMS messages 304 from the network node 204 to the UEs 102.

Example operations according to FIG. 3 can comprise sending, by UE interaction manager 321, the command and control file 301 to all the UE SIM cards in the coverage area, e.g. in service area 110. The command and control file 301 can be configured to scan, or cause UEs 102 to scan, UE 102 logs and other storage locations for malicious files. Also, the command and control file 301 can be configured to analyze, or cause UEs 102 to analyze, internal timers and connections made to internal clocks by applications at UEs 102.

The UE interaction manager 321 can furthermore be configured to send SMS 304 to the UEs 102. The SMS 304 can comprise, e.g., silent SMS messages. The SMS 304 can contain signatures and further analysis tools for use by the command and control file 301. The command and control file 301 can be configured to command files included in SMS 304 to perform limited scans, in order to look for malicious and/or encrypted or unencrypted strings that represent time.

The command and control file 301 at the UEs 102 can be configured to send scan reports 302 back to the security function 220. The security function 220 can be configured to correlate the scan reports 302 and store the scan reports 302 as aggregated scan report data 330.

Malicious file identification 322 can be configured to analyze the aggregated scan report data 330 to identify malicious files and their locations within UEs 102. An advantage of analyzing aggregated scan report data 330 can include the ability to identify a malicious file at one UE and use the malicious file and its storage location to enable identification of the malicious file at other UEs. For example, storage location properties or a malicious file signature can be used to identify storage locations and malicious files at multiple UEs.

In response to identifying a malicious file by malicious file identification 322, the UE interaction manager 321 can be configured to instruct the UEs 102, e.g., the command and control file 301 at the UEs 102, to isolate, delete, or otherwise disable the malicious file. In some embodiments, UEs 102 can be sent a subsequent SMS 304 comprising a link which targets the malicious file.

In some embodiments, the security function 220 can be connected to the core network of communication service provider network(s) 106, and the security function 220 can be configured to force a temporary or one-time targeted malicious code scanner to the UEs 102 as an invisible SMS or file which targets the SIMs at the UEs 102.

Figure 4:
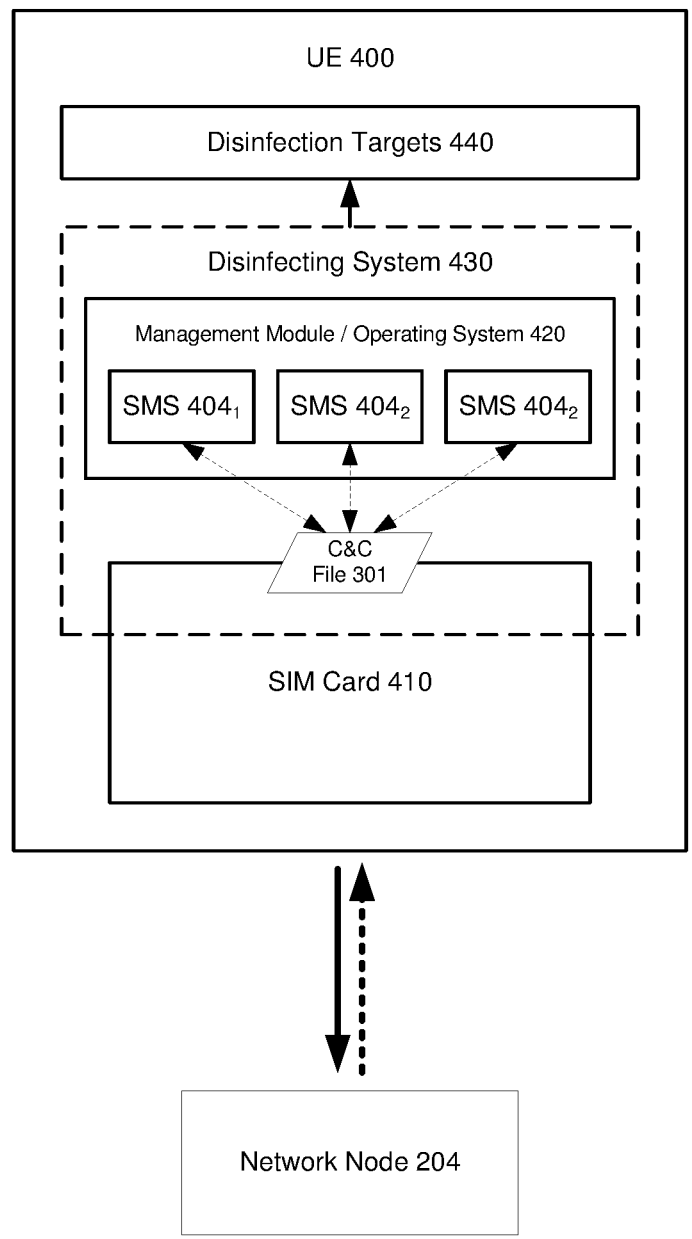
FIG. 4 illustrates example user equipment comprising a subscriber identity module (SIM) and a disinfecting system configured to operate in conjunction with a security function at the network node, in accordance with various aspects and embodiments of the subject disclosure.

FIG. 4 illustrates example user equipment comprising a subscriber identity module (SIM) and a disinfecting system configured to operate in conjunction with a security function at the network node, in accordance with various aspects and embodiments of the subject disclosure. FIG. 4 illustrates the network node 204 introduced in FIG. 2, and a UE 400 which can implement the UEs 102 described in connection with FIG. 1, FIG. 2, and FIG. 3. The UE 400 comprises, inter alia, a SIM 410, a disinfecting system 430, and disinfection targets 440. The SIM 410 comprises the command and control file 301 introduced in FIG. 3. The disinfecting system 430 comprises a management module/operating system 420. The management module/operating system 420 can comprise SMS messages, e.g., example SMS messages 4041, 4042, and 4043, referred to collectively as SMS messages 404.

Example operations of UE 400 can include, e.g., receiving the command and control file 301 from the network node 204, and the UE 400 can be configured to install the command and control file 301 at the SIM 410. The UE 400 can furthermore receive SMS messages 404 from network node 204, optionally as "silent" type SMS messages, and the UE 400 can be configured to store the SMS messages 404 in locations accessible by the management module/operating system 420. The disinfecting system 430 can comprise the SMS messages 404, the command and control file 301, and elements of the management module/operating system 420. The disinfecting system 430 can be configured to scan the UE 400, e.g., the disinfection targets 440, for malicious files pursuant to instructions and data included in the SMS messages 404 and the command and control file 301. The disinfection targets 440 can comprise, e.g., storage locations, registries, timers, or other targets as applicable for detecting various coordinated attacks.

For example, a malicious file may comprise malicious code inserted in user photos and videos. The malicious code could be inserted into, e.g., a third (or other sequence number) video of the user's stored videos. In such a scenario, a disinfection target 440 could therefore comprise all stored photos and videos, or the particular (e.g. third) photo or video in which malicious code is suspected.

The disinfecting system 430 can be configured to generate scan reports, e.g., scan reports 302 such as illustrated in FIG. 3, and send the scan reports to the network node 204. The disinfecting system 430 can receive one or more subsequent SMS messages 404 or other instructions and data, instructing the disinfecting system 430 to isolate, delete or disable a malicious file detected by network node 204, e.g., as described in connection with FIG. 3. The disinfecting system 430 can be configured to isolate, delete or disable malicious files within disinfection targets 440 pursuant to SMS messages 404 or other instructions received from the network node 204.

Figure 5:
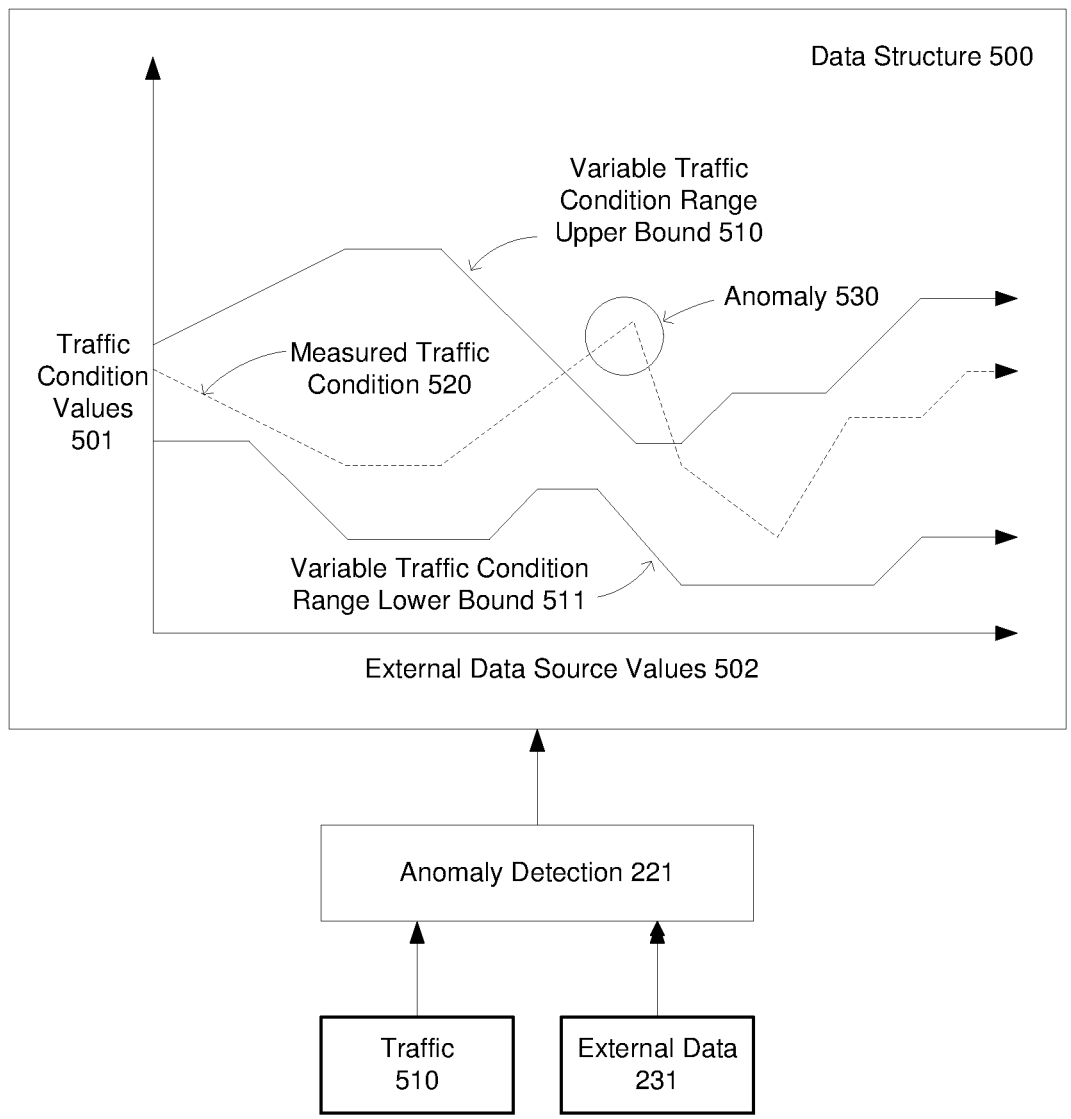
FIG. 5 illustrates example variation of a traffic condition within a variable traffic condition range, in accordance with various aspects and embodiments of the subject disclosure.

FIG. 5 illustrates example variation of a traffic condition within a variable traffic condition range, in accordance with various aspects and embodiments of the subject disclosure. FIG. 5 includes the anomaly detection 221 introduced in FIG. 2. Anomaly detection 221 can use external data 231 and traffic 510 to generate the data structure 500, wherein traffic 510 can comprise, e.g., the traffic 2101 and 2102 introduced in FIG. 2. The example data structure 500 can include a traffic condition values axis 501 and an external data source values axis 502. The example data structure 500 can furthermore include a variable traffic condition range defined by a variable traffic condition range upper bound 510 and a variable traffic condition range lower bound 511. A measured traffic condition 520 can generally vary within the variable traffic condition range, with the exception of anomalies such as anomaly 530.

Data structure 500 is a visual representation of a data structure that can be built, e.g., by an anomaly detection 221 component equipped with machine learning. Anomaly detection 221 can be configured to analyze external data 231 and network traffic 510 over time, and build a knowledge base such as data structure 500, which comprises a traffic condition range for each of multiple different external data source states, represented in FIG. 5 as points along the external data source values axis 502. The traffic condition range, at any point on the external data source values axis 502, can comprise an upper bound defined by variable traffic condition range upper bound 510, and a lower bond defined by variable traffic condition range lower bound 511. The data structure 500 therefore represents a variable traffic condition range, comprising a range of possible traffic conditions which varies for different points on the external data source values axis 502. The measured traffic condition 520 represents a current measured traffic condition 520, which can be compared against the variable traffic condition range in order to detect either normal traffic conditions (inside the range) or anomalies such as anomaly 530. The measured traffic condition 520 can also be used by anomaly detection 221 to adjust the data structure 500 comprising the variable traffic condition range, for the purpose of improving accuracy of future traffic condition assessments.

Figure 6:
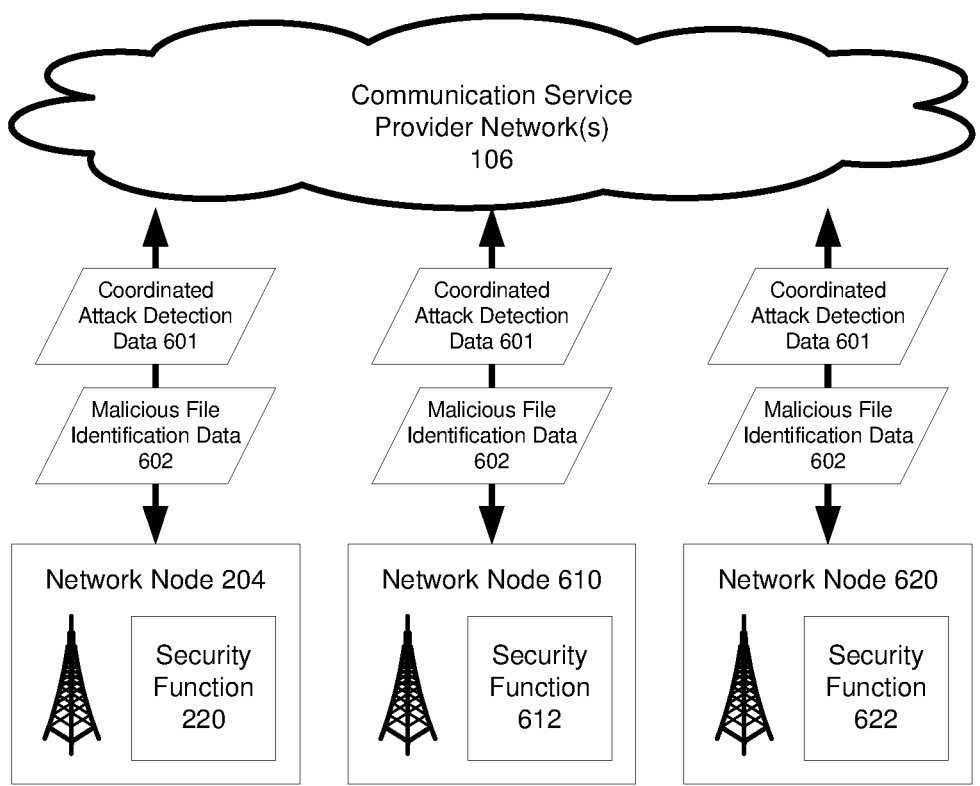
FIG. 6 illustrates example coordination between multiple deployed security functions, in accordance with various aspects and embodiments of the subject disclosure.

FIG. 6 illustrates example coordination between multiple deployed security functions, in accordance with various aspects and embodiments of the subject disclosure. FIG. 6 includes the network node 204 equipped with the security function 220 introduced in FIG. 2, and the communication service provider network(s) 106 introduced in FIG. 1. FIG. 6 furthermore illustrates additional network nodes 610 and 620, wherein the additional network nodes 610 and 620 are equipped with security function 612 and security function 622, respectively. Each of the network nodes 204, 610 and 620 can exchange coordinated attack detection data 601 and malicious file identification data 602 with the other network nodes 204, 610 and 620, wherein coordinated attack detection data 601 and malicious file identification data 602 can optionally be exchanged via the communication service provider network(s) 106.

The additional network nodes 610 and 620 and security functions 612 and 622 can generally be configured similarly to the network node 204 and security function 220, and the additional network nodes 610 and 620 can optionally provide neighbor cells in a same or adjacent geographical area as the service area 110 which is supported by the network node 204.

In an example according to FIG. 6, the security function 220 may detect an anomaly indicative of a coordinated attack, and the security function 220 may implement a corresponding attack mitigation procedure. The security function 220 can include data associated with the detected anomaly, e.g., features of the traffic condition that led to the anomaly, in coordinated attack detection data 601. The security function 220 can furthermore include an identification of its attack mitigation procedure in the in coordinated attack detection data 601. The communication service provider network(s) 106 can relay the coordinated attack detection data 601 to neighbor nodes 610 and 620.

The security functions 612 and 622 can be configured to receive coordinated attack detection data 601, and scan for features of the traffic condition that led to the anomaly detected by the security function 220. In response to identification of features of the traffic condition that led to the anomaly detected by the security function 220, security functions 612 and 622 can be configured to implement, e.g., the attack mitigation procedure identified in coordinated attack detection data 601.

Similarly, the security function 220 may detect a malicious file, and the security function 220 may instruct UEs connected to network node 204 to disable the malicious file. The security function 220 can identify the malicious file and, e.g., the malicious file locations(s) in UEs, in the malicious file identification data 602. The communication service provider network(s) 106 can relay the malicious file identification data 602 to neighbor nodes 610 and 620.

The security functions 612 and 622 can be configured to receive malicious file identification data 602, and optionally evaluate aggregated scan reports for similar malicious file indicators. In response to identification of the malicious file detected by the security function 220, security functions 612 and 622 can be configured to instruct UEs connected to network nodes 610 and 620 to disable the malicious file, using techniques such as described in connection with FIG. 3.

Figure 7:
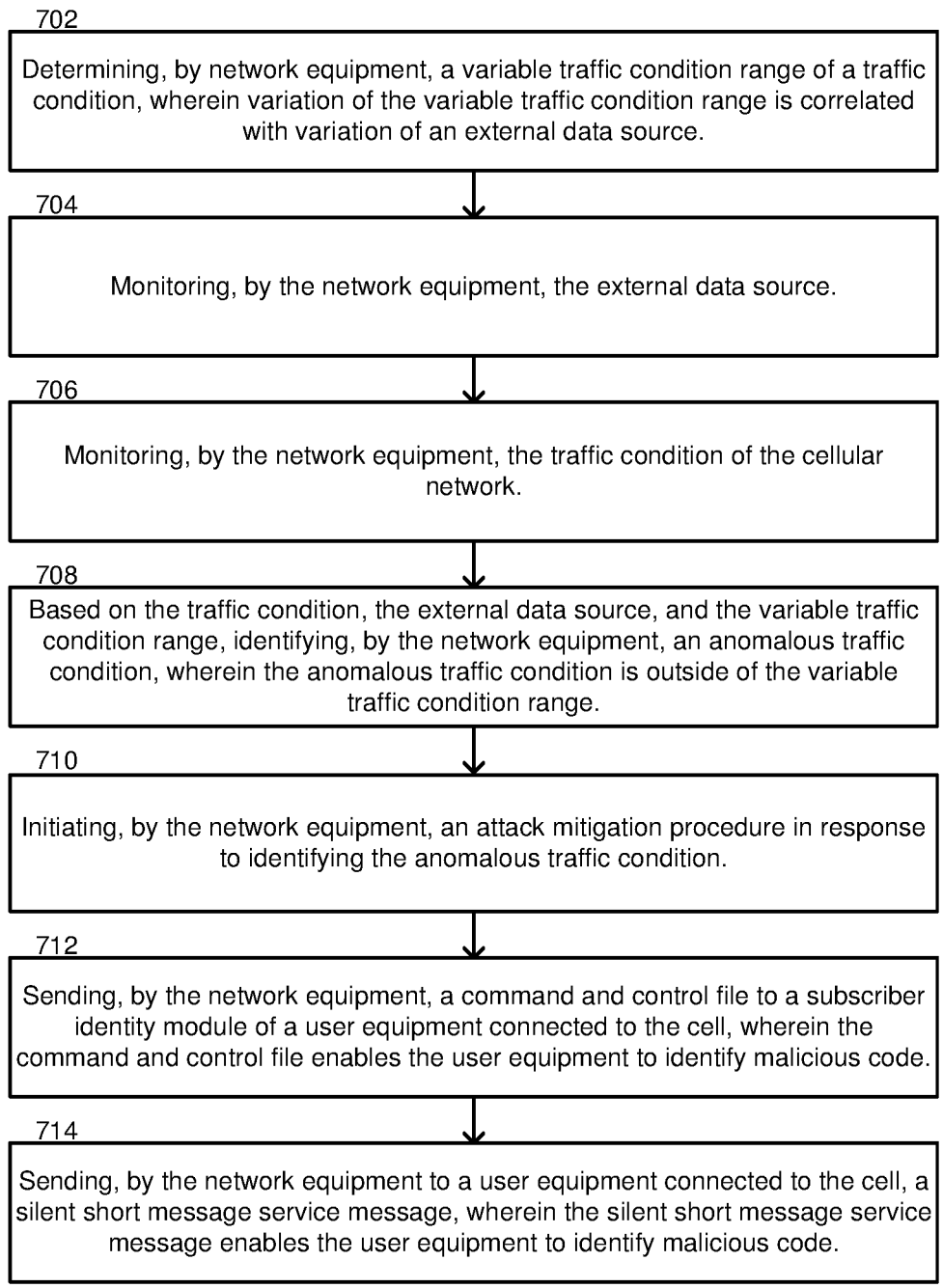
FIG. 7 is a flow diagram representing example operations of a security function in connection with detecting and responding to anomalous traffic conditions, in accordance with various aspects and embodiments of the subject disclosure.

FIG. 7 is a flow diagram representing example operations of a security function in connection with detecting and responding to anomalous traffic conditions, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by network equipment such as network node 204, as illustrated in FIG. 2 and FIG. 3. The network equipment 204 can comprise a security function 220. The network equipment 204 can be located at a RAN node 204 that supports a cell of the cellular network. The network equipment 204 have access to an external data source 230, e.g., a news data source or other external data source which is external to a cellular network comprising the network equipment 204.

Example operation 702 comprises determining, by the network equipment 204, a variable traffic condition range of a traffic condition, wherein variation of the variable traffic condition range is correlated with variation of the external data source 230. For example, anomaly detection 221 can build a data structure 500 such as illustrated in FIG. 5. The traffic condition of traffic 210 can vary within a variable traffic condition range, and variation of the variable traffic condition range can be correlated with variation of the external data source 230. The security function 220 can be configured to use machine learning in connection with determining the variable traffic condition range. The traffic condition can comprise, e.g., a traffic volume of traffic 210 within a defined geographic area 110 served by the cellular network.

Example operation 704 comprises monitoring, by the network equipment 204, the external data source 230, e.g., by monitoring external data 231 comprising a stream of data output from the external data source 230. Example operation 706 comprises monitoring, by the network equipment 204, the traffic condition of the cellular network, e.g., the traffic 210. Example operation 708 comprises, based on the traffic condition (of traffic 210), the external data source 230, and the variable traffic condition range (e.g., in data structure 500), identifying, by the network equipment 204, an anomalous traffic condition (such as anomaly 530), wherein the anomalous traffic condition 530 is outside of the variable traffic condition range (e.g., the range in data structure 500).

Example operation 710 comprises initiating, by the network equipment 204, an attack mitigation procedure in response to identifying the anomalous traffic condition 530. The attack mitigation procedure can comprise, e.g., an analysis of call data records related to emergency calls, staggering user device registrations, and/or throttling network traffic 210, as described herein.

Example operations 712 and 714 can be performed before, after, or during operations 702-710, in order to disinfect UEs 102 to prevent further coordinated attacks. Example operation 712 comprises sending, by the network equipment 204, a command and control file 301 to a SIM of a user equipment, e.g., UE $102_1$, connected to the cell, wherein the command and control file 301 enables the UE $102_1$ to identify malicious code. Example operation 714 comprises sending, by the network equipment 204, to a user equipment, e.g., UE $102_1$, connected to the cell, a silent SMS message, e.g. SMS 304, wherein the SMS message 304 enables the UE 102₁ to identify malicious code. Further disinfection operations are described in connection with FIG. 8.

Figure 8:
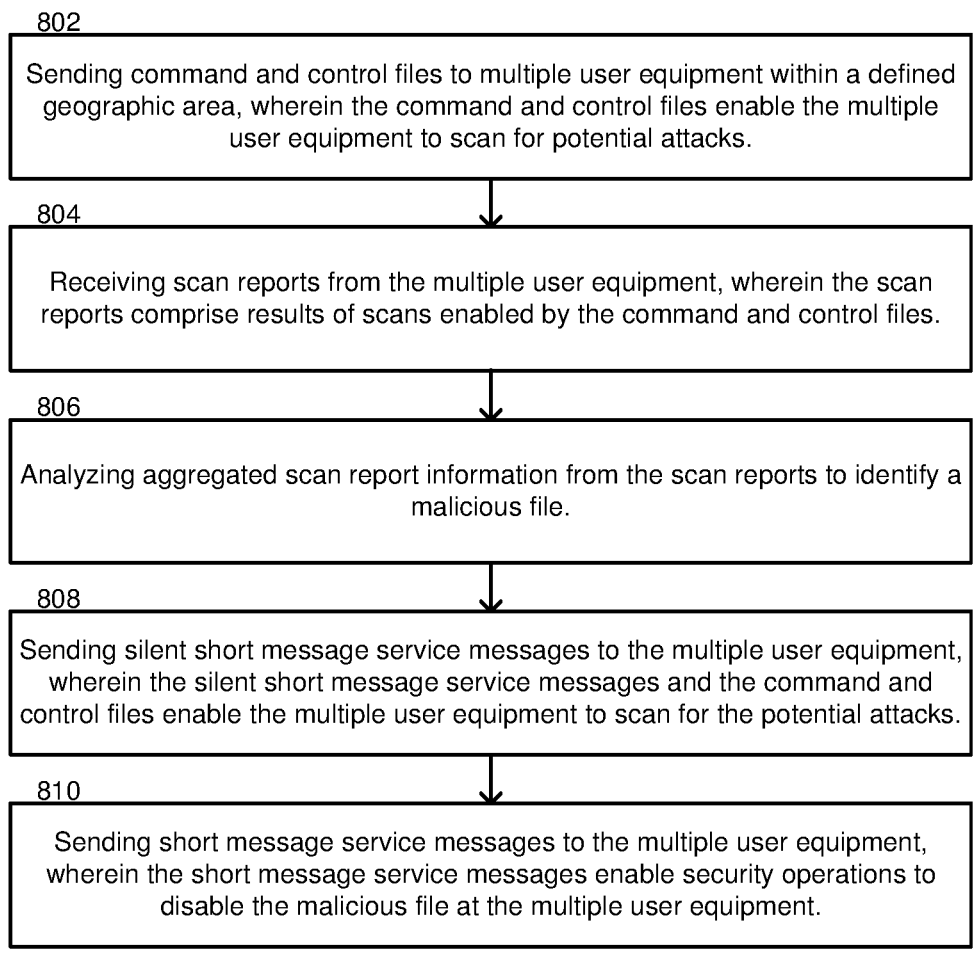
FIG. 8 is a flow diagram representing example operations of a security function in connection with collecting data from connected devices, identifying malicious code, and sending data to the connected devices in order to isolate and remove the malicious code, in accordance with various aspects and embodiments of the subject disclosure.

FIG. 8 is a flow diagram representing example operations of a security function in connection with collecting data from connected devices, identifying malicious code, and sending data to the connected devices in order to isolate and remove the malicious code, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by a network node 204 equipped with a security function 220 as illustrated in FIG. 3. Example operation 802 comprises sending command and control files 301 to multiple user equipment, i.e., UEs 102, within a defined geographic area such as service area 110, wherein the command and control files 301 enable the multiple UEs 102 to scan for potential attacks. Sending the command and control files 301 to the multiple UEs 102 can comprise, e.g., sending the command and control files 301 to SIMs at the multiple UEs 102.

Example operation 804 comprises receiving scan reports 302 from the multiple UEs 102, wherein the scan reports 302 comprise results of scans enabled by the command and control files 301. The scan reports 302 can be stored in aggregated scan report data 330.

Example operation 806 comprises analyzing aggregated scan report information 330 comprising the scan reports 302 to identify a malicious file. The malicious file can optionally be identified at least in part by a malicious file storage location, or by a file hash, a file image, or file properties such as file name, size, type, etc.

Example operation 808 comprises sending silent SMS messages 304 to the multiple UEs 102, wherein the silent SMS messages 304 and the command and control files 301 enable the multiple UEs 102 to scan for the potential attacks. The silent SMS messages 304 and the command and control files 301 can enable the scans for example by including malicious file identification information and/or malicious file location information. In some embodiments, silent SMS messages 304 and the command and control files 301 can enable the multiple UEs 102 to scan for at least one potential attack comprising a string that represents time.

Example operation 810 comprises sending SMS messages, e.g., additional SMS messages 304, to the multiple user equipment 102, wherein the SMS messages 304 enable security operations to disable the malicious file at the multiple UEs 102.

Figure 9:
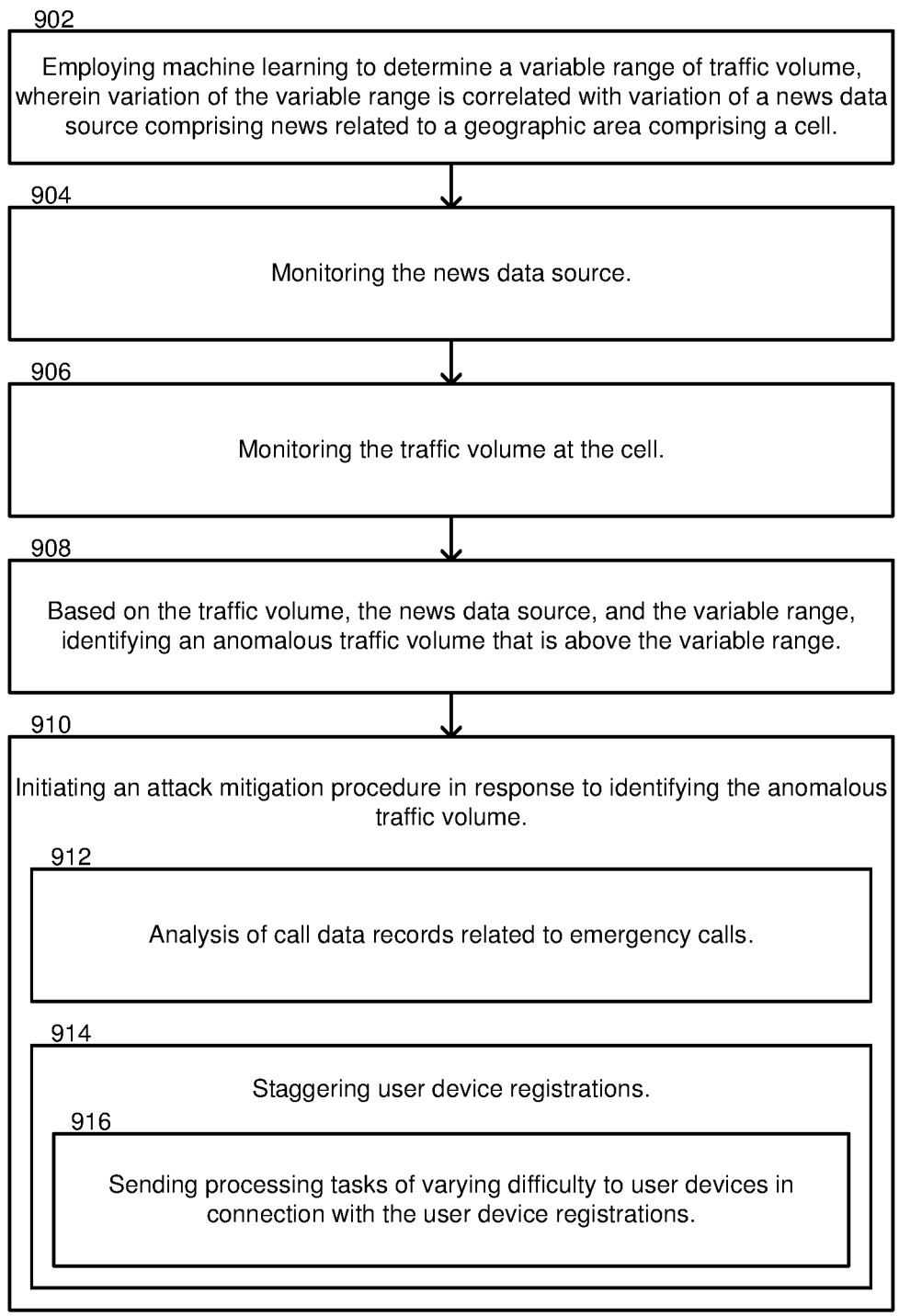
FIG. 9 is a flow diagram representing example operations of network equipment in connection with monitoring a news data source and network traffic volume in order to detect an anomalous traffic volume, in accordance with various aspects and embodiments of the subject disclosure.

FIG. 9 is a flow diagram representing example operations of network equipment in connection with monitoring a news data source and network traffic volume in order to detect an anomalous traffic volume, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by a network node 204 equipped with anomaly detection 221, wherein anomaly detection 221 builds a data structure 500 such as illustrated in FIG. 5. Example operation 902 comprises employing machine learning to determine a variable range of traffic volume, wherein variation of the variable range is correlated with variation of a news data source, e.g., external data 231, which can comprise news related to a geographic area 110 comprising a cell. For example, anomaly detection 221 can employ machine learning to determine a variable range of traffic volume included in traffic 510, and the variable range can be defined by a variable traffic condition range upper bound 510 and a variable traffic condition range lower bound 511.

Example operation 904 comprises monitoring the news data source 231. Example operation 906 comprises monitoring the traffic volume (of traffic 510) at the cell. Example operations 904 and 906 can be performed simultaneously in some embodiments. Example operation 908 comprises, based on the traffic volume (of traffic 510), the news data source 231, and the variable range (in data structure 500), identifying an anomalous traffic volume 530 that is above the variable range.

Example operation 910 comprises initiating an attack mitigation procedure in response to identifying the anomalous traffic volume 530. Example operations 912-916 illustrate example attack mitigation procedures. At operation 912, the attack mitigation procedure comprises an analysis of call data records related to emergency calls. At operation 914, the attack mitigation procedure comprises staggering user device registrations. At operation 916, the operations to stagger user device registrations further comprise sending processing tasks of varying difficulty to user devices in connection with the user device registrations, in order to stagger the user device registrations.

Figure 10:
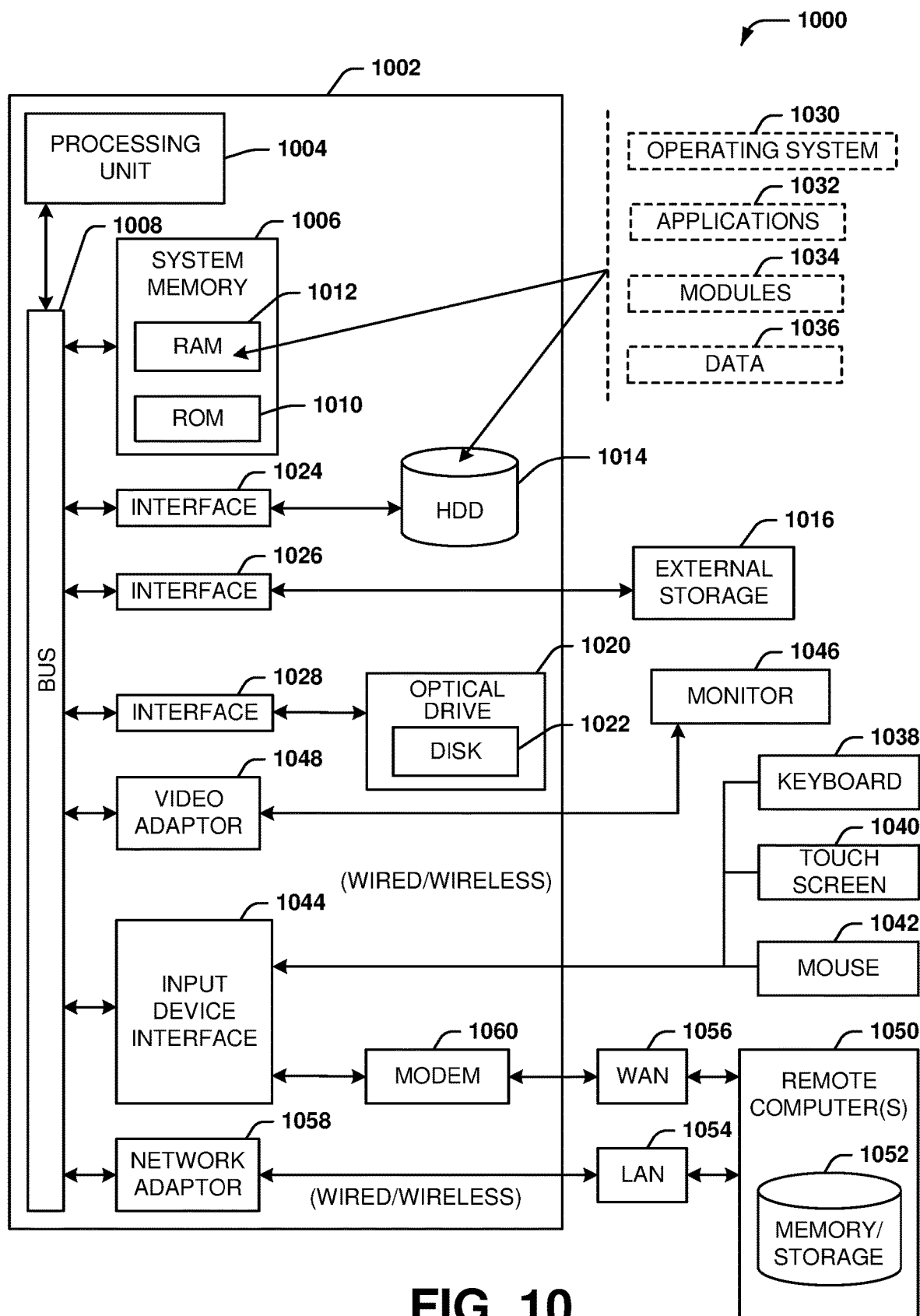
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-Ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
monitoring, by network equipment comprising a processor, an external data source, wherein the external data source is external to a cellular network comprising the network equipment;
monitoring, by the network equipment, a traffic condition of the cellular network, wherein:
the traffic condition varies within a variable traffic condition range, and
variation of the variable traffic condition range is correlated with variation of the external data source;
based on the traffic condition, the external data source, and the variable traffic condition range, identifying, by the network equipment, an anomalous traffic condition, wherein the anomalous traffic condition is outside of the variable traffic condition range; and
initiating, by the network equipment, an attack mitigation procedure in response to identifying the anomalous traffic condition.

2. The method of claim 1, further comprising determining, by the network equipment, the variable traffic condition range.

3. The method of claim 2, wherein the network equipment comprises a security function that uses machine learning in connection with determining the variable traffic condition range.

4. The method of claim 1, wherein the network equipment is located at a radio access network node that supports a cell of the cellular network.

5. The method of claim 4, further comprising sending, by the network equipment, a command and control file to a subscriber identity module of a user equipment connected to the cell, wherein the command and control file enables the user equipment to identify malicious code.

6. The method of claim 4, further comprising sending, by the network equipment to a user equipment connected to the cell, a silent short message service message, wherein the silent short message service message enables the user equipment to identify malicious code.

7. The method of claim 1, wherein the external data source comprises a news data source, and wherein the traffic condition comprises a traffic volume within a defined geographic area served by the cellular network.

8. The method of claim 1, wherein the attack mitigation procedure comprises an analysis of call data records related to emergency calls.

9. The method of claim 1, wherein the attack mitigation procedure comprises staggering user device registrations.

10. The method of claim 1, wherein the attack mitigation procedure comprises throttling network traffic.

11. Network equipment, comprising:
a processor; and
a memory that stores executable instructions that, when executed by the processor, facilitate performance of operations, comprising:
sending command and control files to multiple user equipment within a defined geographic area, wherein the command and control files enable the multiple user equipment to scan for potential attacks;
receiving scan reports from the multiple user equipment, wherein the scan reports comprise results of scans enabled by the command and control files;
analyzing aggregated scan report information from the scan reports to identify a malicious file; and
sending short message service messages to the multiple user equipment, wherein the short message service messages enable security operations to disable the malicious file at the multiple user equipment.

12. The network equipment of claim 11, wherein the operations further comprise sending silent short message service messages to the multiple user equipment, and wherein the silent short message service messages and the command and control files enable the multiple user equipment to scan for the potential attacks.

13. The network equipment of claim 12, wherein the silent short message service messages and the command and control files enable the multiple user equipment to scan for at least one potential attack comprising a string that represents time.

14. The network equipment of claim 11, wherein sending the command and control files to the multiple user equipment comprises sending the command and control files to subscriber identity modules at the multiple user equipment.

15. The network equipment of claim 11, wherein the malicious file is identified at least in part by a malicious file storage location.

16. A non-transitory machine-readable medium, comprising executable instructions that, when executed by a processor of a network node that supports a cell of a cellular communications network, facilitate performance of operations, comprising:

monitoring a news data source comprising news related to a geographic area comprising the cell;

monitoring a traffic volume at the cell, wherein:

the traffic volume varies within a variable range, and variation of the variable range is correlated with variation of the news data source;

based on the traffic volume, the news data source, and the variable range, identifying an anomalous traffic volume that is above the variable range; and initiating an attack mitigation procedure in response to identifying the anomalous traffic volume.

17. The non-transitory machine-readable medium of claim 16, wherein the operations further comprise employing machine learning to determine the variable range.

18. The non-transitory machine-readable medium of claim 16, wherein the attack mitigation procedure comprises an analysis of call data records related to emergency calls.

19. The non-transitory machine-readable medium of claim 16, wherein the attack mitigation procedure comprises staggering user device registrations.

20. The non-transitory machine-readable medium of claim 19, wherein the operations further comprise sending processing tasks of varying difficulty to user devices in connection with the user device registrations, in order to stagger the user device registrations.

* * * * *